United States Patent [19]

Axford et al.

[11] Patent Number: 4,568,113

[45] Date of Patent: Feb. 4, 1986

[54] PIPE CONNECTION

[75] Inventors: Robert A. Axford, Houston; Edgar C. Wood, Jr., Huntsville; Herbert F. Brandana, Spring, all of Tex.

[73] Assignee: AWB, Inc., Houston, Tex.

[21] Appl. No.: 481,797

[22] Filed: Apr. 4, 1983

[51] Int. Cl.[4] .............................................. F16L 25/00
[52] U.S. Cl. ...................................... 285/334; 285/55; 285/383; 285/390
[58] Field of Search .................. 285/55, 334, 333, 390, 285/383

[56] References Cited

U.S. PATENT DOCUMENTS

| | | | |
|---|---|---|---|
| 590,811 | 9/1897 | Storrow | 285/55 |
| 1,525,414 | 2/1925 | Roeckner | 285/383 X |
| 2,183,644 | 10/1939 | Frame | 10/101 |
| 2,532,632 | 12/1950 | MacArthur | 285/146 |
| 2,587,544 | 2/1952 | Sneddon | 285/146 |
| 2,854,760 | 12/1974 | Duret | 285/334 |
| 3,054,628 | 9/1962 | Hardy et al. | 285/332.3 |
| 3,079,181 | 2/1963 | Vander Wissel | 285/333 |
| 3,100,656 | 8/1963 | MacArthur | 285/55 |
| 3,185,502 | 5/1965 | MacArthur | 285/55 |
| 3,210,096 | 10/1965 | Vander Wissel | 285/115 |
| 3,224,799 | 12/1965 | Blose et al. | 285/334 |
| 3,266,821 | 8/1966 | Safford | 285/55 X |
| 3,307,860 | 3/1967 | Blount et al. | 285/55 |
| 3,336,054 | 8/1967 | Blount et al. | 285/55 |
| 3,359,013 | 12/1967 | Knox et al. | 285/13 |
| 3,467,413 | 9/1969 | Madrelle | 285/332.2 |
| 3,468,563 | 9/1969 | Duret | 285/93 |
| 3,489,437 | 1/1970 | Duret | 285/55 |
| 3,503,771 | 4/1970 | Duret | 285/334 |
| 3,574,373 | 4/1971 | Le Derf | 287/117 |
| 3,856,337 | 12/1974 | Ehm et al. | 285/334 |
| 3,994,516 | 11/1976 | Fredd | 285/39 |
| 4,026,583 | 5/1977 | Gottlieb | 285/55 |
| 4,033,615 | 7/1977 | Miller, Jr. et al. | 285/333 |
| 4,121,862 | 10/1978 | Greer | 285/333 |
| 4,366,971 | 1/1983 | Lula | 285/55 |
| 4,373,750 | 2/1983 | Mantelle et al. | 285/55 |
| 4,373,754 | 2/1983 | Bollfrass et al. | 285/334 |
| 4,377,302 | 3/1983 | Kohyama et al. | 285/334 |
| 4,384,737 | 5/1983 | Ruesser | 285/334 |
| 4,398,756 | 8/1983 | Duret et al. | 285/334 |

FOREIGN PATENT DOCUMENTS 109945  5/1925  Switzerland .................... 285/383

Primary Examiner—Richard J. Scanlan, Jr.
Attorney, Agent, or Firm—Hubbard, Thurman, Turner & Tucker

[57] ABSTRACT

Disclosed is a threaded pipe connection. The connection includes tubular externally threaded male members and a tubular internally threaded female coupling threadedly engaged with the male members. The male members include a continuous thread having a first preferably straight portion and a second tapered portion. The thread includes a form having stabbing and load blanks and an axially extending crest and root. Throughout the thread, lead as measured along the load flanks is constant and the length of the crest and depth of the load flanks are constant.

16 Claims, 7 Drawing Figures

PIPE CONNECTION

BACKGROUND OF THE INVENTION

A. Field of the Invention

The present invention relates generally to threaded connections for tubular goods, and more particularly to a threaded connection for use on tubular goods of bimetallic construction as used in the production of oil and gas.

B. Description of the Prior Art

It has become increasingly necessary to produce oil and gas from reservoirs containing significant amounts of $H_2S$ and/or $CO_2$. Serious corrosion and embrittlement problems can occur when conventional carbon steel tubular goods are used in such environments. Corrosion inhibitors have been used, but these are costly and not always effective. The industry has considered using tubulars made entirely of stainless steel, nickel alloys, or even titanium alloys. However, such materials, while generally having high performance characteristics, are very expensive and may require special handling techniques.

The most satisfactory solution developed so far involves the use of bimetallic tubes, which include a high strength outer pipe or shell with an inner liner or pipe of a corrosion resistant material. Such tubes offer the advantages of having load-bearing and rugged-handling characteristics of conventional steel tubes with the corrosion resistance of high-alloy materials.

Since oil field tubular goods come in discrete lengths, it is necessary to connect them together to form strings. The connections must be likewise protected against corrosion or embrittlement. There have been manufactured for use with bimetallic pipe couplings of solid corrosion resistant material, such as stainless steel. However, such stainless steel couplings lack the strength and rugged handling characteristics of ordinary couplings. There have been developed for use with bimetallic pipe threaded connections of ordinary steel but with means for protecting the connection material. Examples of such connections are disclosed in U.S. Pat. Nos. 3,307,860; 3,336,054; 4,026,583; and 4,373,750.

In addition to being able to withstand the corrosive effects of sour gas environments, pipes and their connections must be able to withstand service in deep high-pressure wells. Wells in excess of 15,000 feet in depth and 20,000 pounds per square inch in pressure are not uncommon. Accordingly, pipes and connections must have high tensile strength and the connections must provide effective leak proof seals. Additionally, oil field tubular goods are often subjected to rough treatment when they are connected together on site. The threaded connections must be resistant to galling, jamming, cross threading, and mechanical damage to sealing surfaces.

It is therefore an object of the present invention to connect together bimetallic pipe in such way that the internal structure presents a continuous metalurgical barrier while the external coupling maintains the mechanical properties of the pipe. It is a further object of the present invention to provide a threaded connection for use in sour gas environments that has a tensile strength approaching that of the pipes being interconnected. It is a further object of the present invention to provide a threaded connection for use in sour gas environments that is substantially leak proof at all operating pressure. It is a further object of the present invention to provide a threaded connection that is resistant to galling, jamming, cross threading, and mechanical damage.

SUMMARY OF THE INVENTION

The tubular connection of the present invention includes first and second externally threaded male members and an internally threaded coupling threadedly engaging the males members. Each male member includes an outer pipe and an inner pipe or liner formed of a corrosion resistant metal. The coupling is made of the same material as the outer pipes of the male members, but does not present itself to the inside of the pipe.

The threaded interconnection between each male member and the coupling is provided by a continuous helical thread having a first straight, untapered, portion and a second tapered portion. The thread has a form including stabbing and load flanks and an axially extending crest and root. Throughout the thread, lead as measured along the load flanks is constant and the length of the crest and the depth of the load flank are constant.

The ends of the male members are cut so as to form a metal-to-metal substantially impenetrable seal across the inside of the connection. In one embodiment, the ends of the male members abut each other at a seal rim formed on the inner periphery of the male member. In a second embodiment, the ends of the male members abut and seal on a tubular metal ring manufactured of the same material as the metallic tube liner. When a preload is applied to male members, the end of each male member seats itself against the other end or the metallic seat, due to controlled plastic deformation, and forms the primary seal for the connection.

The coupling includes internal of the threads a pair of opposed outwardly directed frusto-conical sealing surfaces and each male member includes an external frusto-conical sealing surface sealingly mateable with the coupling. The frusto-conical sealing surfaces provide a secondary seal that is self-energizing in that as pressure inside the pipe increases, the metal is forced together for an improved seal. The frusto-conical sealing surfaces on the male members are spaced axially a substantial distance apart from the threaded portion. Such spacing serves as a pilot during makeup which prevents or reduces the likelihood of cross threading. Additionally, the spacing assists in the self-energizing feature of the secondary seal and causes a bending moment which enhances the primary seal. As weight or tensile force is applied against the primary seal, the initial preload preserves the seal. However, should excessive weight be applied and the primary seal break, the secondary seal remains valid and will, in fact, be improved.

DESCRIPTION OF THE PREFERRED EMBODIMENT

Figure 1:
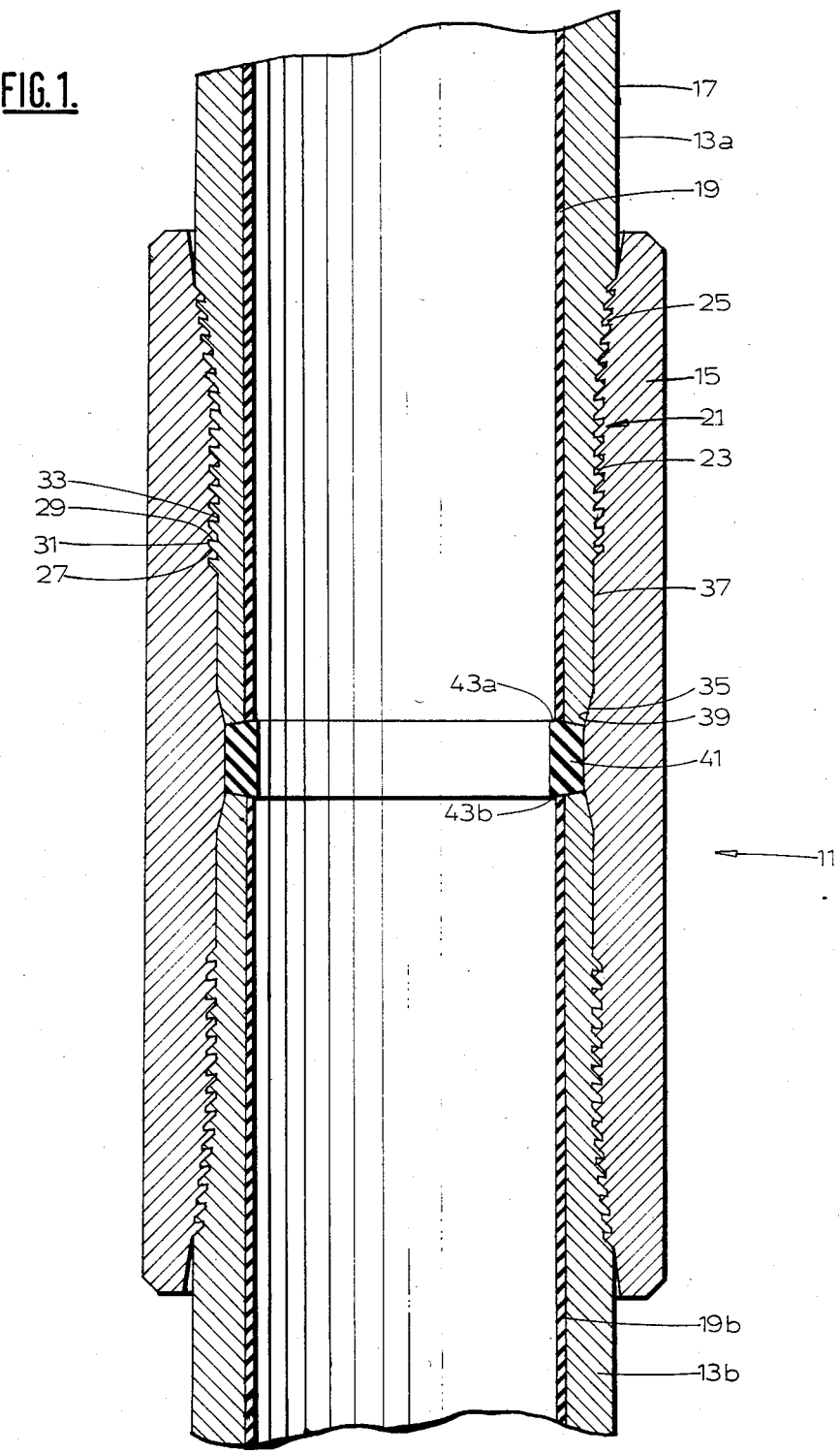
FIG. 1 is a sectional view of a preferred embodiment of the tubular joint of the present invention.

Referring now to the drawings, and first to FIG. 1, the tubular joint of the present invention is designated by the numeral 11. Joint 11 includes, generally, a pair of externally threaded male members or pipes 13a and 13b and an internally threaded coupling 15. Male members 13a and 13b are substantially similar to each other and each includes an outer pipe 17 of ordinary steel and an inner pipe or liner 19 of corrosion resistant metal, for example, stainless steel.

Each male member 13a and 13b includes a continuous thread designated generally by the numeral 21. Thread 21 includes a first, nontapered portion 23 and a second tapered portion 25. Thread 21 includes a generally trapezoidal thread form which includes a stabbing flank 27, a load flank 29, an axially extending crest 31, and axially extending root 33. In the preferred embodiment, load flank 29 is reverse angled or hooked so as to enhance the tensile strength of the joint.

Throughout the length of thread 21, in both first nontapered portion 23 and second tapered portion 25, thread lead, as measured along the load flank parallel to the axis of the male member, is constant. Additionally, the axial length of crest 31 and the depth of the thread as measured from crest 31 to root 33 across load flank 29 are constant.

Coupling 15 is formed of tubular metal stock of the same material as outer pipe 17. Coupling 15 includes threaded portions which compliment and interfit with the dual tapered threaded portions, including thread 21 of the male members.

Male members 13a and 13b each includes an external frusto-conical sealing surface 35, which is separated from thread 21 by a cylindrical portion 37. Coupling 15 includes a pair of internal frusto-conical sealing surfaces, including a surface 39 which mates and seals with surface 35. Male member frusto-conical sealing surface 35 and cylindrical portion 37 also serve as pilot for guiding or stabbing the male members into coupling 15. The substantial length of cylindrical portion 37 coacts with the generally cylindrical surface formed by the crests of the straight portion of the internal threads of coupling 15 thereby to align the male member within the coupling to prevent cross threading. Also, because of the dual taper of thread 21, first nontapered thread 23 stabs into the tapered portion of coupling 15, thereby to reduce the likelihood of jamming as sometimes occurs when a tapered pin is stabbed into a box of like taper. Additionally, the taper of second tapered portion 25 of thread 21 is preferably substantially greater than the standard $\frac{3}{4}$ inch per foot on diameter. The steep taper enables the joint to go from hand tight to power tight very quickly and preferably in less than one turn, thereby to reduce the likelihood of galling.

In the embodiment of FIG. 1, joint 11 includes a generally tubular washer 41, which is carried within coupling 15 between the ends of male members 13a and 13b. Washer 41 is preferably formed of the same corrosion resistant metal as that which forms inner pipe or liner 19. Washer 41 forms metal-to-metal seals with liners 19 and 19b at 43a and 43b, respectively.

Figure 2:
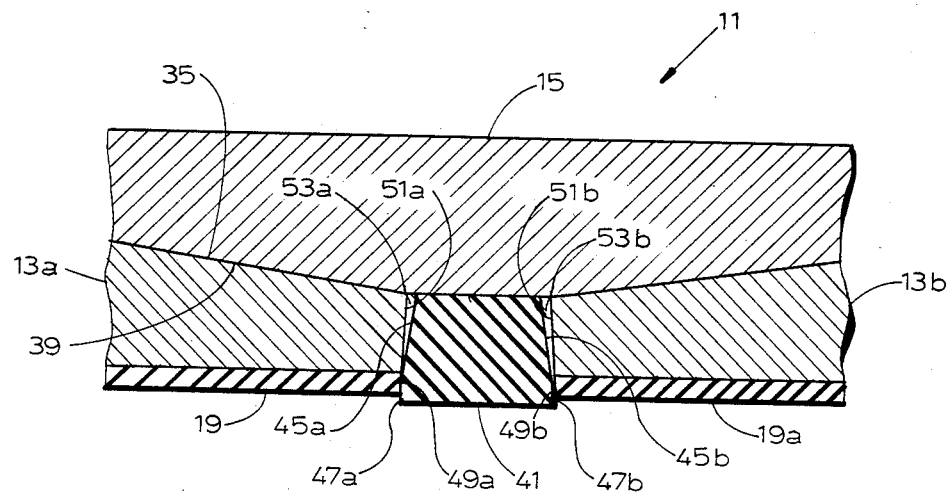
FIG. 2 is an enlarged cross section view showing details of the seal arrangement in the embodiment of FIG. 1.

Referring now to FIG. 2, there is shown an enlargement of the seal area of the embodiment of the invention shown in FIG. 1. Washer 41 has a generally trapezoidal cross-section and has an inside diameter slightly smaller than the inside diameters of male members 13a and 13b. Washer 41 has a pair of sloping faces 45a and 45b and generally flat sealing rims 47a and 47b about its inner periphery. Liners 19 and 19a of male members 13a and 13b, respectively, define generally flat sealing rims 49a and 49b, respectively which cooperate with rims 47a and 47b, respectively, to form metal-to-metal seals. The radially outer portions of the ends of male members 13a and 13b define frusto-conical faces 51a and 51b, respectively. Faces 51a and 51b extend radially forward of rims 49a and 49b, thereby to protect rims 49a and 49b from mechanical damage. The angles of faces 51a–b and 45a–b differ so as to define therebetween void spaces 53a and 53b when joint 11 is made up hand tight. However, when joint 11 is made up power tight, voids 53a and 53b are lost to controlled plastic deformation.

Figure 3:
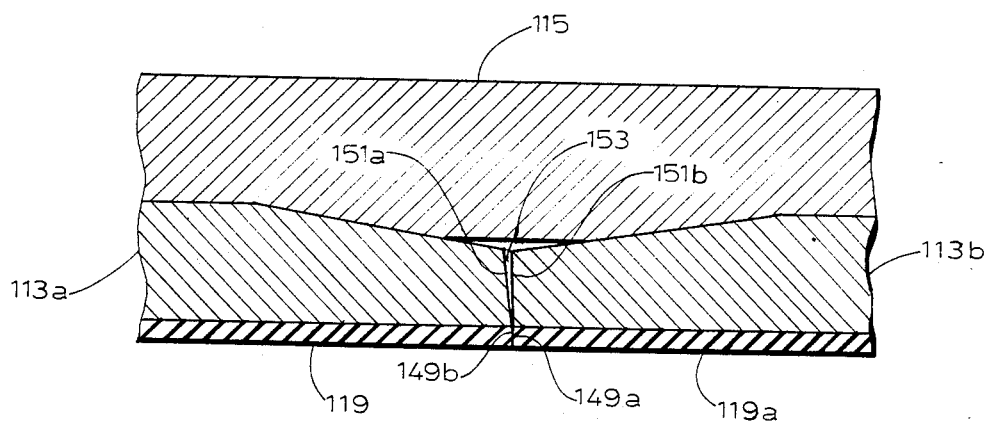
FIG. 3 is a sectional view showing details of the seal area in an alternative embodiment of the present invention.

Referring now to FIG. 3, there is shown an alternative embodiment of the present invention wherein male members 113a and 113b abut and seal on each other. Liners 119 and 119a define sealing rims 149a and 149b respectively. Male members 113a and 113b include faces 151a and 151b respectively which define therebetween a void 153. In the embodiment of FIG. 3, face 151b slopes axially forward of rim 149b and face 151a slopes axially rearward of rim 149a. In the embodiment of FIG. 3, male member 113a would be inserted into coupling 115 at the manufacturing facility so that coupling 115 would provide protection to rim 149a.

Figure 4A:
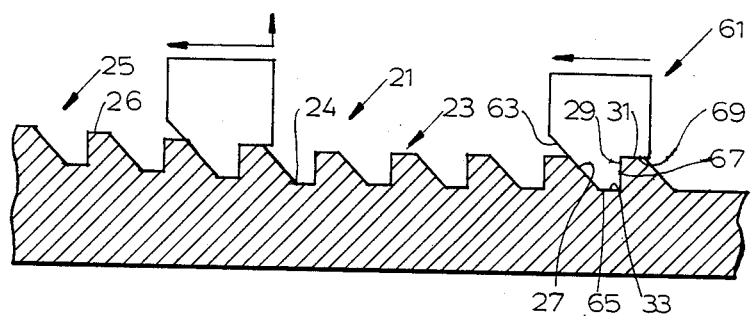
FIGS. 4A and 4B are schematic views showing the method of threading the male member of the present invention.
Figure 4B:
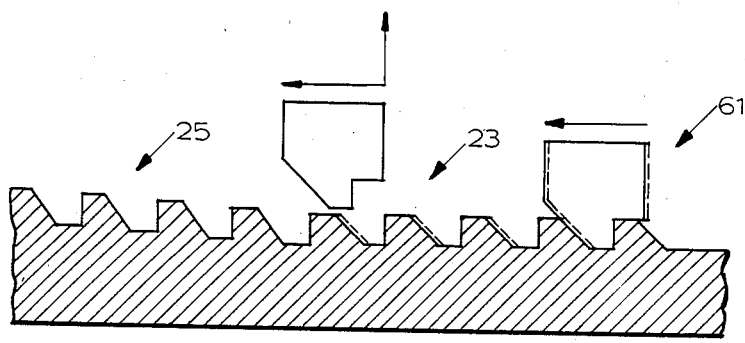

Referring now to FIGS. 4 and 5 there is shown generally the method by which the dual tapered thread of the present invention is cut. Referring first to FIGS. 4a and 4b, which show the method of cutting an external thread, a thread cutting insert 61 is provided. Thread cutting insert 61 includes a leading edge 63 for cutting the stabbing flank 27 a bottom edge 65 for cutting the root 33, a trailing edge 67 for cutting load flank 29, and a topping edge 69 for cutting crest 31. To cut thread 21, the tubular work piece is rotated at a constant speed of rotation about its axis and thread cutting insert 61 is moved at a substantially constant linear speed in the direction toward and parallel to the axis of the tubular work piece initially to cut first nontapered portion 23. When thread cutting insert 61 reaches the end of first nontapered portion 23, which end is designated by the numeral 24, thread cutting insert 61 continues to move at the same constant speed parallel to the axis of the tubular work piece, but additionally begins to move in a direction perpendicular to the axis of the work piece thereby to form second tapered portion 25.

Since throughout the cutting of thread 21, the work piece rotates at a constant speed of rotation and thread cutting insert 61 moves at a constant linear speed parallel to the axis of the work piece, lead measured along the load flanks parallel to the axis of the work piece remains constant. However, it will be observed that the crests in second tapered portion 25, as for example crest 26, are narrower than the crests in first nontapered portion 23. The difference between crest length in the straight and tapered portions causes the threaded profile to be nonuniform throughout the thread and may result in flank to flank interference when the male and female members are connected together. Accordingly, the method of threading the joint of the present invention includes the further step of shortening the crests in the first nontapered portion of the thread. As shown in FIG. 4b, in a final pass, thread cutting insert 61 is displaced in the direction toward the work piece parallel to the axis thereof a distance equal to the difference between the crests in straight portion 23 and tapered portion 25. With thread cutting insert 61 so displaced, the work piece is rotated at the same constant speed of rotation and thread cutting insert 61 is moved axially along the work piece. However, when thread cutting insert 61 reaches the last straight thread, thread cutting tool 61 is pulled rapidly away from the work piece at an angle greater than the tapered portion so as not to affect the tapered threads.

Figure 5A:
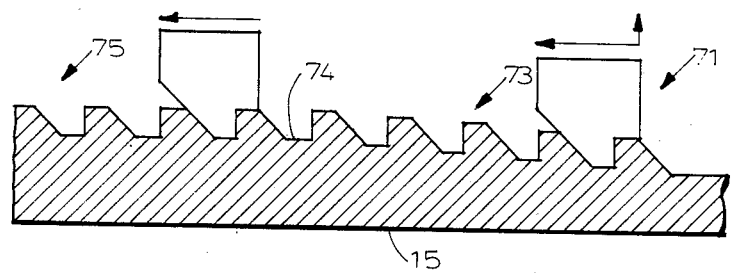
FIGS. 5A and 5B are schematic views showing the method of threading the coupling of the present invention.
Figure 5B:
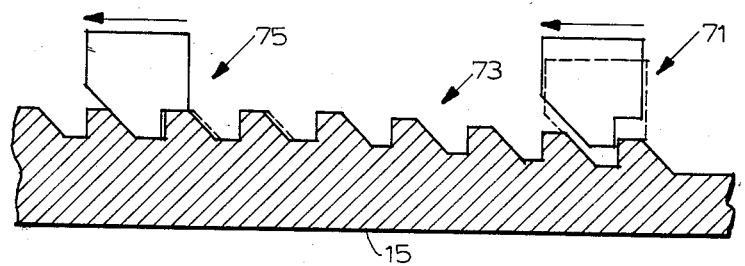

FIGS. 5a and 5b depict schematically the cutting of the threads and coupling 15. A thread cutting insert 71, which is similar to thread cutting insert 61 is provided. In cutting the thread, the tubular work piece is rotated at a constant speed of rotation and thread cutting insert 71 is moved at a constant speed in the direction parallel to the axis of the work piece and at a constant slower speed in the direction perpendicular to the axis of the work piece to cut the tapered portion 73 when thread cutting insert 71 reaches the first thread 74 of the straight portion 75, the speed component perpendicular to the axis of the work piece is stopped but the component parallel to the component continues and thread cutting insert 71 cuts the straight portion 75.

Again, it will be observed that the crests in straight portions 75 are longer than the crests in tapered portion 73. Consequently, as shown in FIG. 5b, the method of threading coupling 15 includes the step of shortening the crest in straight portion 75. In the crest shortening step, thread cutting insert 71 is initially displaced radially outwardly to correspond to the diameter of the straight portion 75 and axially a distance equal to the difference between the lengths of the crest and straight portion 75 and tapered portion 73. With the work piece continuing to rotate at the same constant speed of rotation, thread cutting insert 71 is moved in the direction parallel to the axis of the work piece at the same constant linear speed.

From the foregoing it will be seen that this invention is one well adapted to attain all of the ends and objects hereinabove set forth together with other advantages which are inherent to the apparatus.

It will be understood that certain features and subcombinations are of utility and may be employed with reference to other features and subcombinations. This is contemplated by and is within the scope of the claims.

As many possible embodiments may be made of the invention without departing from the scope thereof is to be understood that all matters herein set forth as shown in the accompanying drawings are to be interpreted as illustrative and not in a limiting sense.

What is claimed is:

1. A tubular joint, which comprises:
   a tubular externally threaded male member having a continuous helical thread having a first threaded portion with a flat angle of taper with respect to the axis of said male member and a second threaded portion with a second angle of taper with respect to the axis of said male member, said second angle of taper being greater than first angle of taper, said helical thread having a form including stabbing and load flanks and an axially extending crest and root, wherein throughout said thread, lead as measured along the load flanks is constant and the length of said crest and the depth of said load flank are constant and the length of the root in said first threaded portion is longer than the length of the root in said second threaded portion;
   and a tubular internally threaded female member having a continuous helical thread mateable with said helical thread of said male member, said helical thread of said male member having a first threaded portion with a first angle of taper with respect to the axis of said female member substantially equal to said first angle of taper of said male member, and a second angle of taper with respect to said axis of said female member substantially equal to said second angle of taper of said male member, said female member helical thread having a form including stabbing and load flanks and an axially extending crest and root, wherein throughout said female helical thread, lead as measured along the load flanks is constant and the length of said crest and the depth of said load flank are constant and the length of the root in said first threaded portion is longer than the root in said second threaded portion.

2. The tubular joint as claimed in claim 1, wherein said first angles of taper of said first threaded portions of said male and female members are substantially equal to zero.

3. The tubular joint as claimed in claim 1, wherein:
   said female member includes an internal frusto-conical sealing surface interior of said helical thread;
   said male member includes an external frusto-conical sealing surface sealingly mateable with said sealing surface of said female member.

4. The tubular joint as claimed in claim 3, wherein:
   said male member includes an end having a sealing rim about the inner periphery of said male member and a front face extending radially outwardly from said sealing rim;
   and said female member includes shoulder means having a sealing rim for sealingly engaging said sealing rim of said male member and including a shoulder means front face extending radially outwardly from said sealing rim of said female member, wherein at initial contact of said sealing rims said front faces are axially spaced apart.

5. The tubular joint as claimed in claim 4, wherein said front face of said male member end slopes axially from said sealing rim toward said female member shoulder means.

6. The tubular joint as claimed in claim 4, wherein:
   said male member includes inner and outer pipes, said inner pipe being formed of corrosion resistant metal;
   and said female member shoulder means includes an inner portion including said female member shoulder sealing rim formed of corrosion resistant metal.

7. The tubular joint as claimed in claim 6, wherein said female member shoulder includes a tubular corrosion resistant metal washer contained within said female member.

8. The tubular joint as claimed in claim 4, wherein:
   said female member shoulder means includes a second tubular male member threadedly engaged with said female member.

9. The tubular joint as claimed in claim 8, wherein:
   said second tubular male member includes a continuous helical external thread having a first threaded portion with a first angle of taper with respect to the axis of said second male member and a second threaded portion with a second angle of taper with respect to said axis of said second male member, said second angle of taper being greater than said first angle of taper, said second male member helical thread having a thread form including stabbing and load flanks and an axially extending crest and root, wherein throughout said second member helical thread, lead as measured along the load flanks is constant and the length of said crest and the depth of said load flank are constant and the length of the root in said first threaded portion is longer than the length of the root in said second threaded portion;

and said female member has a second internal continuous helical thread mateable with said second male member helical thread, said female member second helical thread having a first threaded portion with a first angle of taper with respect to said axis of said female member substantially equal to said second male member first angle of taper, and a second threaded portion with a second angle of taper with respect to said axis of said female member substantially equal to said second male member second angle of taper, said female member helical thread having a form including stabbing and load flanks and an axially extending crest and root, wherein throughout said female member second thread, lead as measured along the load flanks is constant and the length of said crest and the depth of said load flank are constant and the length of the root in said first threaded portion is longer than the length of the root in said second threaded portion.

10. The tubular joint as claimed in claim 9, wherein said first angles of taper of the first male member and the second male member are substantially equal and the second angles of taper of said first and second male members are equal.

11. The tubular joint as claimed in claim 10, wherein said first angles of taper are substantially zero.

12. The tubular joint as claimed in claim 9, wherein said male members each include inner and outer pipe, said inner pipes being formed of a corrosion resistant metal.

13. The tubular joint as claimed in claim 1, wherein said load flanks of said male and female member threads are reverse angled.

14. The tubular joint as claimed in claim 1, wherein the angle of said stabbing flank of said male member thread with respect to said male member axis is greater than the male member second angle of taper with respect to said male member axis.

15. A tubular joint, which comprises:

first and second externally threaded male members, said male members each including an outer pipe and an inner pipe, said inner pipe being formed of a corrosion resistant metal, each of said male members including an unthreaded inner end having an external frusto-conical sealing surface and a sealing rim about the inner periphery of said inner pipe and having a front face extending radially outwardly from said sealing rim;

and an internally threaded coupling threadedly engaging said male members, said coupling including a pair of oppositely outwardly directed fursto-conical sealing surfaces therein matingly sealing engaging said fursto-conical sealing surfaces of said male members, wherein said sealing rims of said male members, sealingly abut and seal with each other, and when said sealing rims initially abut, said front faces are spaced apart.

16. A tubular joint, which comprises:

first and second externally threaded male members, said male members each including an outer pipe and an inner pipe, said inner pipe being formed of a corrosion resistant metal, each of said male members including an unthreaded inner end having an external frusto-conical sealing surface and a sealing rim about the inner periphery of said inner pipe and having a front face extending radially outwardly from said sealing rim;

an internally threaded coupling threadedly engaging said male members, said coupling including a pair of oppositely outwardly directed frusto-conical sealing surface therein matingly sealing engaging said frusto-conical sealing surface of said male members;

and a tubular washer of corrosion resistant metal within said coupling between the ends of said male members, the ends of said washer including sealing rims adjacent the inner periphery thereof with end faces extending radially outwardly therefrom, said sealing rims of said male members sealingly engaging the sealing rims of said washer, wherein when said sealing rims of said male members and said washer initially abut said front faces and end faces are spaced apart.

* * * * *